United States Patent
Lee

(10) Patent No.: US 11,943,418 B2
(45) Date of Patent: Mar. 26, 2024

(54) PROCESSING METHOD AND PROCESSING SYSTEM FOR MULTIPLE DEPTH INFORMATION

(71) Applicant: eYs3D Microelectronics, Co., Taipei (TW)

(72) Inventor: Chi-Feng Lee, Hsinchu County (TW)

(73) Assignee: EYS3D MICROELECTRONICS Co., Taipei (TW)

( * ) Notice: Subject to any disclaimer, the term of this patent is extended or adjusted under 35 U.S.C. 154(b) by 0 days.

(21) Appl. No.: 17/233,241

(22) Filed: Apr. 16, 2021

(65) Prior Publication Data

US 2021/0329212 A1 Oct. 21, 2021

Related U.S. Application Data

(60) Provisional application No. 63/011,246, filed on Apr. 16, 2020.

(51) Int. Cl.
| | | |
|---|---|---|
| *H04N 19/119* | (2014.01) | |
| *H04N 13/128* | (2018.01) | |
| *H04N 13/161* | (2018.01) | |
| *H04N 13/243* | (2018.01) | |
| *H04N 19/124* | (2014.01) | |
| *H04N 19/167* | (2014.01) | |
| *H04N 19/176* | (2014.01) | |
| *H04N 19/186* | (2014.01) | |
| *H04N 13/00* | (2018.01) | |

(52) U.S. Cl.
CPC ......... *H04N 13/128* (2018.05); *H04N 13/161* (2018.05); *H04N 13/243* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 2007/0189750 A1* | 8/2007 | Wong | G03B 13/30 348/E5.045 |
| 2012/0236114 A1 | 9/2012 | Chang et al. | |
| 2015/0092992 A1* | 4/2015 | Ishihara | G02B 7/365 382/106 |
| 2015/0170400 A1* | 6/2015 | Seitz | G06T 15/08 345/427 |
| 2015/0208057 A1* | 7/2015 | Wu | H04N 13/271 348/49 |
| 2017/0039686 A1* | 2/2017 | Miura | G06F 3/04845 |
| 2017/0109940 A1 | 4/2017 | Guo et al. | |
| 2018/0130255 A1* | 5/2018 | Hazeghi | H04N 13/239 |
| 2020/0051265 A1 | 2/2020 | Kim et al. | |

* cited by examiner

*Primary Examiner* — Christopher Braniff
(74) *Attorney, Agent, or Firm* — Innovation Counsel LLP

(57) ABSTRACT

A processing method and a processing system for multiple depth information are provided. The processing method for multiple depth information includes the following steps. A plurality of first images and a plurality of second images are obtained. The first images and the second images are inputted to the same depth generating unit. The first images and the second images are calculated by the depth generating unit to obtain a plurality of depth information corresponding to the first images and the second images.

14 Claims, 7 Drawing Sheets

PROCESSING METHOD AND PROCESSING SYSTEM FOR MULTIPLE DEPTH INFORMATION

This application claims the benefit of U.S. provisional application Ser. No. 63/011,246, filed Apr. 16, 2020, the subject matter of which is incorporated herein by reference.

BACKGROUND OF THE INVENTION

Field of the Invention

The invention relates in general to a processing method and a processing system and more particularly to a processing method and a processing system for multiple depth information.

Description of the Related Art

Along with the rapid advance in display technology, a 3D display technology has been provided. According to the 3D display technology, a left-eye original image and a right-eye original image can be inputted to a depth engine to calculate depth information. When several resolutions or baselines are required, several depth engines are needed to calculate several sets of left-eye and right-eye original images to generate multiple depth information.

SUMMARY OF THE INVENTION

The present disclosure relates to a processing method for multiple depth information. The processing method for multiple depth information includes the following steps. A plurality of original images are obtained. A plurality of first images and a plurality of second images are obtained according to the original images. The first images and the second images are inputted to the same depth generating unit. The first images and the second images are calculated by the depth generating unit to obtain a plurality of depth information. A processing method and a processing system for multiple depth information are provided. The processing method for multiple depth information includes the following steps. A plurality of first images and a plurality of second images are obtained. The first images and the second images are inputted to the same depth generating unit. The first images and the second images are calculated by the depth generating unit to obtain a plurality of depth information corresponding to the first images and the second images.

According to another embodiment of the present disclosure, a processing system for multiple depth information is provided. The processing system includes an image capturing module and a depth generating unit. The image capturing module is used to obtain a plurality of first images and a plurality of second images. The depth generating unit is used to receive and calculate the first images and the second images to obtain a plurality of depth information corresponding to the first images and the second images.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
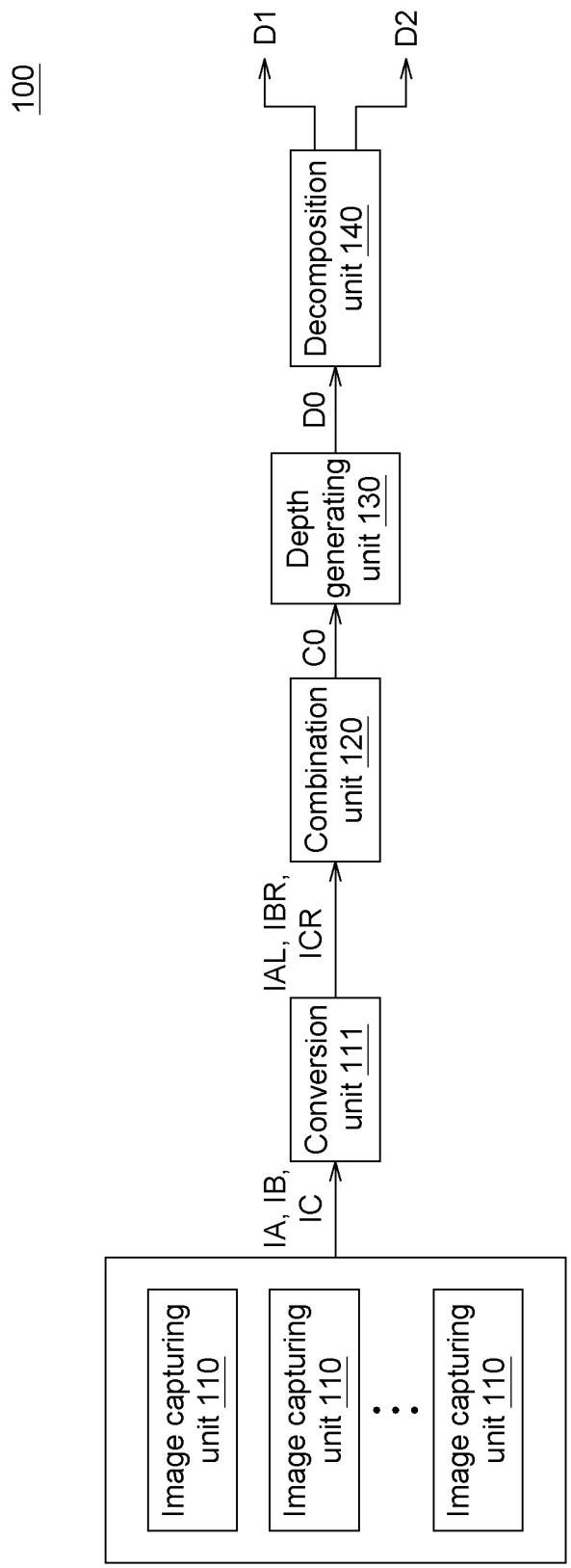
FIG. 1 illustrates a block diagram of a processing system for multiple depth information according to an embodiment.

Referring to FIG. 1, a block diagram of a processing system 100 for multiple depth information according to an embodiment is shown. The processing system 100 includes an image capturing module (not illustrated), a depth generating unit 130 and a decomposition unit 140. In the embodiment of the invention, the image capturing module includes a plurality of image capturing units 110, a conversion unit 111 and a combination unit 120. The image capturing units 110 are used to capture and process color images, grayscale images or infra-red images. The image capturing units 110 can be realized by such as color cameras, black and white cameras or infra-red cameras. The quantity of the image capturing units 110 can be two or above. The conversion unit 111, the combination unit 120, the depth generating unit 130 and/or the decomposition unit 140 can be realized by such as programming codes, circuits, chips, circuit boards or storage devices for storing programming codes.

The image capturing units 110 simultaneously obtain images IA, IB and IC. The same depth generating unit 130 can calculate the images IA, IB and IC to obtain depth information D1 and D2. Details of the processing method for multiple depth information of the present embodiment are disclosed below with an accompanying flowchart.

Figure 2:
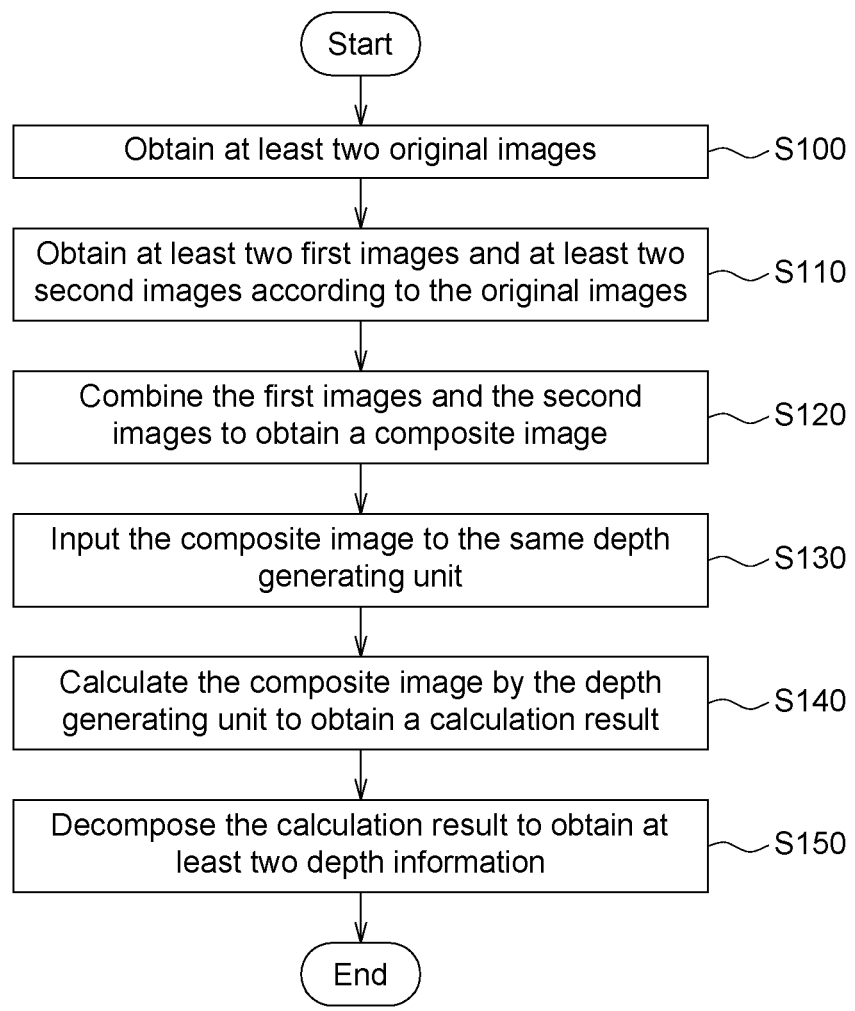
FIG. 2 illustrates a flowchart of a processing method for multiple depth information according to an embodiment.
Figure 3A:
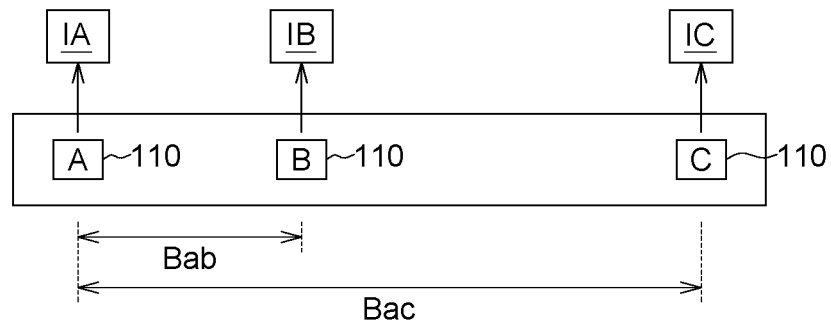
FIG. 3A illustrates a schematic diagram of image capturing units according to an embodiment.

Referring to FIG. 2, a flowchart of a processing method for multiple depth information according to an embodiment is shown. Firstly, the method begins at step S100, original images IA, IB and IC are obtained by the image capturing units 110. Referring to FIG. 3A, a schematic diagram of image capturing units 110 according to an embodiment is shown. In the example of FIG. 3A, the quantity of the image capturing units 110 is exemplified by 3. The image capturing unit 110 designated by "B" is disposed between the image capturing unit 110 designated by "A" and the image capturing unit 110 designated by "C". The baseline Bab is located between the image capturing unit 110 designated by "A" and the image capturing unit 110 designated by "B". The baseline Bac is located between the image capturing unit 110 designated by "A" and the image capturing unit 110 designated by "C". The baseline Bac is greater than the baseline Bab. The image capturing unit 110 designated by "A" is used to obtain the original image IA. The image capturing unit 110 designated by "B" is used to obtain the original image IB. The image capturing unit 110 designated by "C" is used to obtain the original image IC. The image capturing units 110 simultaneously obtain the original images IA, IB and IC.

Figure 3B:
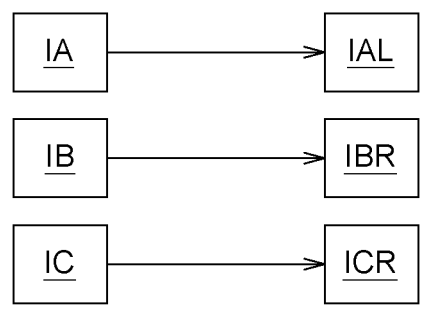
FIG. 3B illustrates a conversion of original images.

Then, the method proceeds to step S110, first image IAL and second images IBR and ICR are obtained by the conversion unit 111 according to the original images IA, IB and IC. Referring to FIG. 3B, a conversion of original images IA, IB and IC is shown. The first image IAL and the second images IBR and ICR can be obtained from the original images IA, IB and IC by a de-warping process, a rectification process and a resolution adjustment process. The first image IAL can be a left-eye image; the second images IBR and ICR can be right-eye images.

Figure 4A:
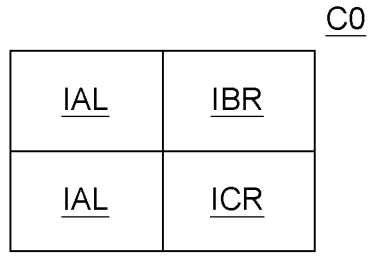
FIG. 4A illustrates a combination of the first images and the second images according to an embodiment.

Then, the method proceeds to step S120, the first image IAL and the second images IBR and ICR are combined by the combination unit 120 to obtain a composite image C0. Referring to FIG. 4A, a combination of the first image IAL and the second images IBR and ICR according to an embodiment is shown. In the embodiment of FIG. 4A, two first images IAL are arranged in a vertical direction and the second images IBR and ICR are arranged in a vertical direction to obtain a composite image C0. That is, the first image IAL and the second image IBR are arranged in a horizontal direction; the first image IAL and the second image ICR are arranged in a horizontal direction. Such arrangement is adopted by the depth generating unit 130 during the horizontal scanning calculation.

In the present step, the images IA, IB and IC can have the same resolution and can be converted into the first image IAL and the second images IBR and ICR without adjusting the resolution, such that the first image IAL and the second image IBR maintain the same resolution, and the first image IAL and the second image ICR also maintain the same resolution.

Figure 4B:
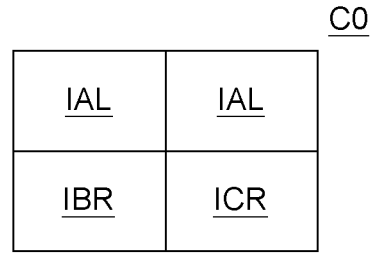
FIG. 4B illustrates a combination of the first images and the second images according to another embodiment.

Referring to FIG. 4B, a combination of the first image IAL and the second images IBR and ICR according to another embodiment is shown. In the embodiment of FIG. 4B, two first images IAL are arranged in a horizontal direction, and the second images IBR and ICR are arranged in a horizontal direction to obtain a composite image C0. That is, the first image IAL and the second image IBR are arranged in a vertical direction, and the first image IAL and the second image ICR are also arranged in a vertical direction. Such arrangement is one of the possible implementations.

Figure 4C:
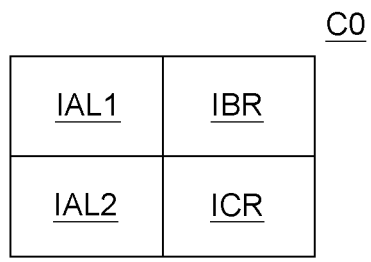
FIG. 4C illustrates a combination of the first images and the second images according to another embodiment.

Referring to FIG. 4C, a combination of first images IAL1 and IAL2 and second images IBR and ICR according to another embodiment is shown. In another embodiment, the first images IAL1 and IAL2 can be two different first images obtained from the same original image IA adjusted using two different adjustment parameters. Or, the first image IAL1 and the first image IAL2 can be two different first images obtained from the same original image IA processed by two different processing procedures (such as different colors, brightness levels or formats).

Figure 4D:
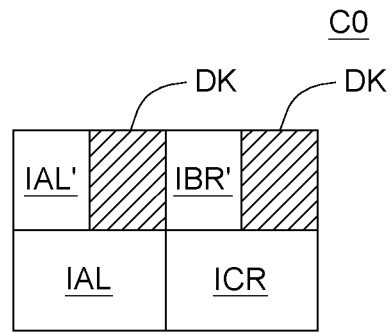
FIG. 4D illustrates a combination of the first images and the second images according to another embodiment.

Referring to FIG. 4D, a combination of the first images IAL' and IAL, the second image IBR', the second image ICR according to another embodiment is shown. In the embodiment of FIG. 4D, the first images IAL' and IAL have different resolutions (the resolution of the first image IAL' is lower than that of the first image IAL), and the second image IBR' and the second image ICR also have different resolutions (the resolution of the second image IBR' is lower than that of the second image ICR). In FIG. 4D, the first images IAL' and IAL can be two different first images obtained from the same original image IA by different resolution adjustment procedures. Or, the first image IAL' can be obtained from the original image IA by a resolution adjustment procedure, and the first image IAL and the original image IA maintain the same resolution. In FIG. 4D, the slash shade represents null data DK. The combination unit 120 combines the first images IAL' and IAL, the second image IBR', the second image ICR and the null data DK to obtain a composite image C0.

Figure 4E:
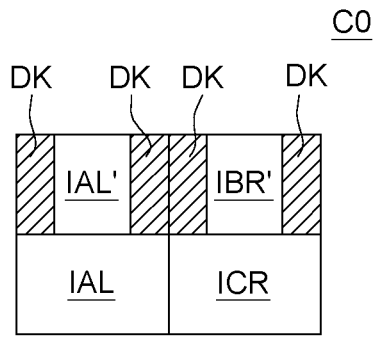
FIG. 4E illustrates a combination of the first images and the second images according to another embodiment.

Referring to FIG. 4E, a combination of the first images IAL' and IAL, the second image IBR', the second image ICR according to another embodiment is shown. In the embodiment of FIG. 4E, the first image IAL' is interposed in the null data DK, and the second image IBR' is also interposed in the null data DK. The positions of the first image IAL' and the second image IBR' are not restricted as long as the combination unit 120 can provide a flag (such as a parameter or a signal) capable of informing subsequent elements of the positions of the first image IAL' and the second image IBR'.

Figure 4F:
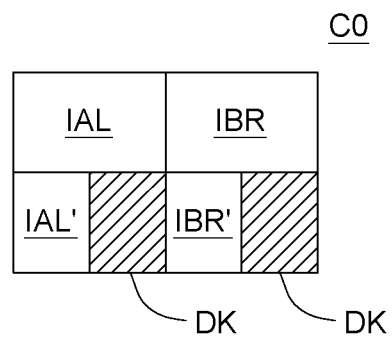
FIG. 4F illustrates a combination of the first images and the second images according to another embodiment.

Referring to FIG. 4F, a combination of the first images IAL and IAL', the second images IBR and IBR' according to another embodiment is shown. In the embodiment of FIG. 4F, the first image IAL and the first image IAL' have different resolutions (the first image IAL' the resolution of is lower than that of the first image IAL), and the second image IBR' and the second image ICR also have different resolutions (the resolution of the second image IBR' is lower than that of the second image ICR). In FIG. 4F, the first images IAL' and IAL can be two different first images obtained from the same original image IA by different resolution adjustment procedures. Or, the first image IAL' can be obtained from the original image IA by a resolution adjustment procedure. The resolution of the first image IAL maintains the same with that of the original image IA. Similarly, the second image IBR' and the second image IBR can be two different second images obtained from the same original image IB by different resolution adjustment procedures. Or, the second image IBR' can be obtained from the original image IB by a resolution adjustment procedure, and the second image IBR and the original image IB maintain the same resolution. In the present step, the first images IAL and IAL' and the second images IBR and IBR' can be obtained from two original images IA and IB' generated by two image capturing units 110.

Figure 4G:
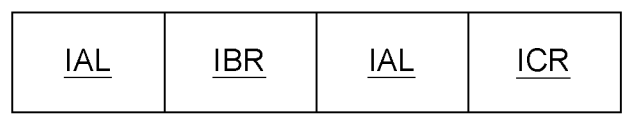
FIG. 4G illustrates a combination of the first images and the second images according to another embodiment.

Referring to FIG. 4G, a combination of the first image IAL and the second images IBR and ICR according to another embodiment is shown. In FIG. 4G, the first image IAL, the second image IBR, the first image IAL, the second image ICR are sequentially arranged in a horizontal direction. Such arrangement is adopted by the depth generating unit 130 during the horizontal scanning calculation.

Then, the method proceeds to step S130, the composite image C0 is inputted to the same depth generating unit 130.

Figure 5A:
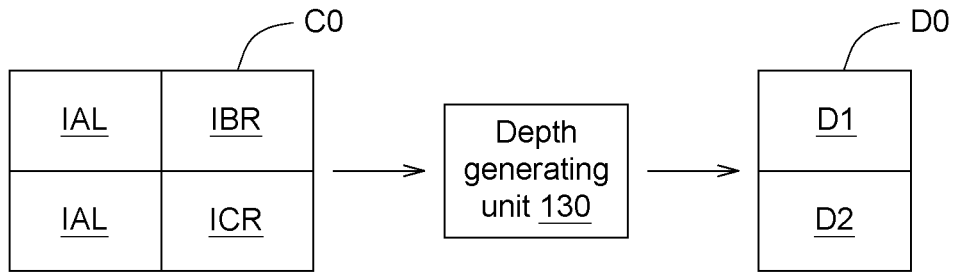
FIG. 5A illustrates a calculation result obtained from the input of the composite image of FIG. 4A.

Then, the method proceeds to step S140, the composite image C0 is calculated by the depth generating unit 130 to obtain a calculation result D0. Referring to FIG. 5A, a calculation result D0 obtained from the input of the composite image C0 of FIG. 4A is shown. In the composite image C0 of FIG. 4A, two first images IAL are arranged in a vertical direction, and the second images IBR and ICR are arranged in a vertical direction, therefore in the calculation result D0 outputted from the depth generating unit 130, the depth information D1 and D2 will also be arranged in a vertical direction.

Figure 5B:
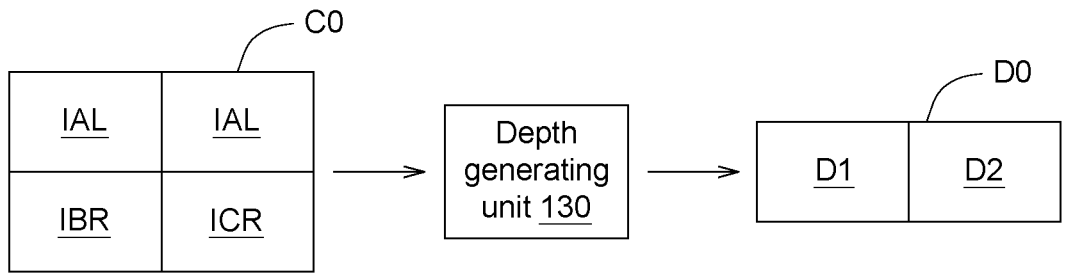
FIG. 5B illustrates a calculation result obtained from the input of the composite image of FIG. 4B.

Referring to FIG. 5B, a calculation result D0 obtained from the input of the composite image C0 of FIG. 4B is shown. In the composite image C0 of FIG. 4B, two first images IAL are arranged in a horizontal direction, and the second images IBR and ICR are arranged in a horizontal direction, therefore in the calculation result D0 outputted from the depth generating unit 130, the depth information D1 and D2 will also be arranged in a horizontal direction.

Figure 5C:
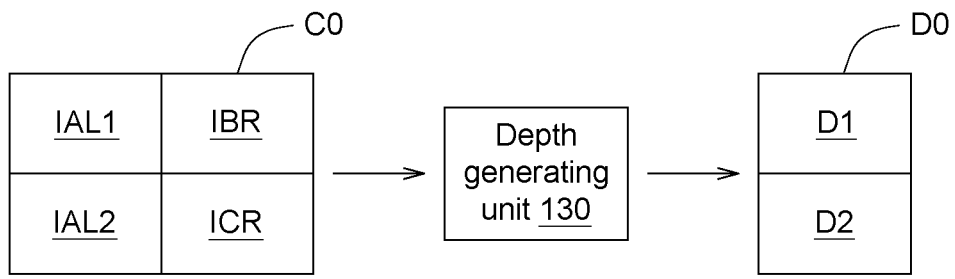
FIG. 5C illustrates a calculation result obtained from the input of the composite image of FIG. 4C.

Referring to FIG. 5C, a calculation result D0 obtained from the input of the composite image C0 of FIG. 4C is shown. In the composite image C0 of FIG. 4C, the first image IAL1 and the first image IAL2 are arranged in a vertical direction, and the second images IBR and ICR are also arranged in a vertical direction, therefore in the calculation result D0 outputted from the depth generating unit 130, the depth information D1 and D2 will also be arranged in a vertical direction.

Figure 5D:
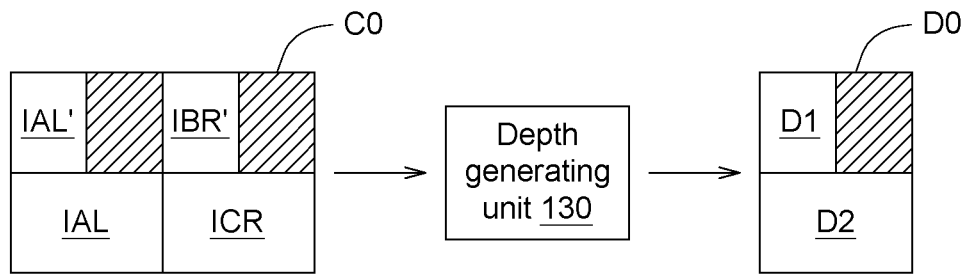
FIG. 5D illustrates a calculation result obtained from the input of the composite image of FIG. 4D.

Referring to FIG. 5D, a calculation result D0 obtained from the input of the composite image C0 of FIG. 4D is shown. In the composite image C0 of FIG. 4D, the resolution of the first image IAL' is lower than that of the first image IAL, and the resolution of the second image IBR' is lower than that of the second image ICR, therefore in the calculation result D0 outputted from the depth generating unit 130, the resolution of the depth information D1 will also be lower than that of depth information D2.

Figure 5E:
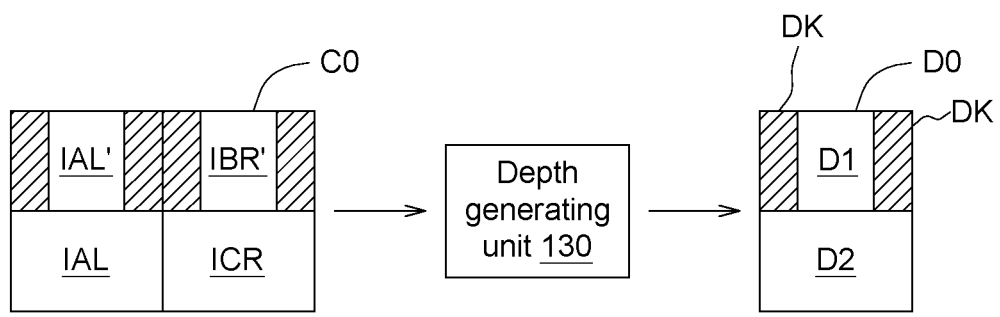
FIG. 5E illustrates a calculation result obtained from the input of the composite image of FIG. 4E.

Referring to FIG. 5E, a calculation result D0 obtained from the input of the composite image C0 of FIG. 4E is shown. In the composite image C0 of FIG. 4E, the first image IAL' is interposed in the null data DK, and the second image IBR' is also interposed in the null data DK, therefore in the calculation result D0 outputted from the depth generating unit 130, the depth information D1 will also be interposed in the null data DK.

Figure 5F:
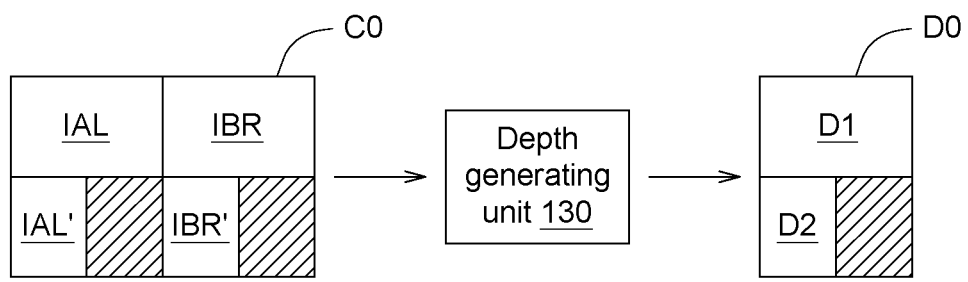
FIG. 5F illustrates a calculation result obtained from the input of the composite image of FIG. 4F.

Referring to FIG. 5F, a calculation result D0 obtained from the input of the composite image C0 of FIG. 4F is shown. In the composite image C0 of FIG. 4F, the resolution of the first image IAL' is lower than that of the first image IAL, and the resolution of the second image IBR' is lower than that of the second image ICR, therefore in the calculation result D0 outputted from the depth generating unit 130, the resolution of depth information D2 will also be lower than that of the depth information D1.

Figure 5G:
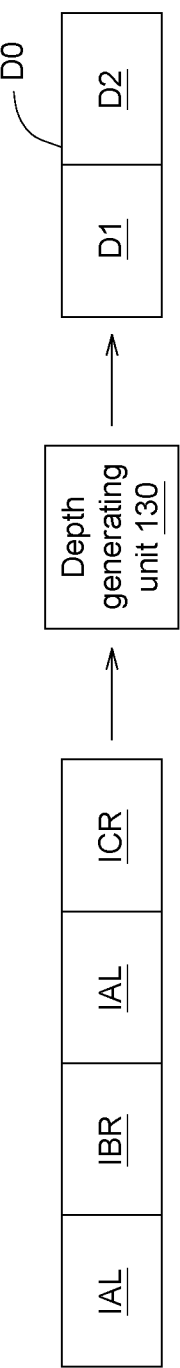
FIG. 5G illustrates a calculation result obtained from the input of the composite image of FIG. 4G.

Referring to FIG. 5G, a calculation result D0 obtained from the input of the composite image C0 of FIG. 4G is shown. In the composite image C0 of FIG. 4G, the first image IAL, the second image IBR, the first image IAL and the second image ICR are sequentially arranged in a horizontal direction, therefore in the calculation result D0 outputted from the depth generating unit 130, the depth information D1 and D2 will also be arranged in a horizontal direction.

Then, the method proceeds to step S150, the calculation result D0 is decomposed by the decomposition unit 140 to obtain the depth information D1 and D2. The decomposition unit 140 can obtain the positions and scope of the the depth information D1 and D2 according to a flag (such as a parameter or a signal) to decompose the depth information D1 and D2. Or, the decomposition unit 140 can decompose the depth information D1 and D2 according to the boundaries recognized by using the image processing technology.

Besides, the depth generating unit 130 can also perform calculation in a time-division multiplexing manner without using the combination unit 120 or the decomposition unit 140. For example, when the first image IAL and the second images IBR and ICR are inputted to the depth generating unit 130, a flag (such as a parameter or a synchronous signal) can be inserted to the first image IAL and the second images IBR and ICR, such that the depth generating unit 130 can regard the first image IAL and the second images IBR and ICR as two separate images and can directly process the two separate images to output the two pieces of depth information D1 and D2 without performing combination or decomposition.

No matter time-division multiplexing is adopted or not, the original images IA, IB and IC are simultaneously obtained. The depth information D1 and D2, which are lastly obtained, still correspond to the same time point. The images have very low time gap therebetween and are suitable for fast moving objects.

In the embodiment, the image capturing module includes a plurality of image capturing units 110, a conversion unit 111 and a combination unit 120. However, in other embodiments of the present invention, the conversion units and the combination unit of the image capturing module can be combined. In another embodiment of the present invention, the image capturing units, the conversion unit and the combination unit of the image capturing module can also be combined.

According to the embodiment, multiple depth information can be generated by the same depth generating unit 130 without incurring extra cost. The design of using the same depth generating unit 130 makes hardware design more flexible.

While the invention has been described by way of example and in terms of the preferred embodiment(s), it is to be understood that the invention is not limited thereto. On the contrary, it is intended to cover various modifications and similar arrangements and procedures and the scope of the appended claims therefore should be accorded the broadest interpretation so as to encompass all such modifications and similar arrangements and procedures.

What is claimed is:

1. A processing method for multiple depth maps, comprising:
   simultaneously obtaining a plurality of first images and a plurality of second images;
   combining the first images and the second images, which are simultaneously obtained, to obtain a composite image;
   inputting the composite image to only one depth generating unit; and
   calculating the composite image by the only one depth generating unit to obtain a plurality of depth maps corresponding to the first images and the second images and corresponding to an identical time point;
   wherein the first images are arranged in a vertical direction and the second images are arranged in a vertical direction; or
   the first images are arranged in a horizontal direction and the second images are arranged in a horizontal direction.

2. The processing method for multiple depth maps according to claim 1, further comprising the following steps:

simultaneously capturing a plurality of original images; and obtaining the first images and the second images according to the original images.

3. The processing method for multiple depth maps according to claim 1, wherein a quantity of the first images is two, a quantity of the second images is two, and the original images are captured by two or three image capturing units.

4. The processing method for multiple depth maps according to claim 1, wherein the first images have different resolutions and the second images have different resolutions.

5. The processing method for multiple depth maps according to claim 1, wherein each of the first images and each of the second images are calculated by the depth generating unit in a time-division multiplexing manner to obtain each of the depth maps.

6. The processing method for multiple depth maps according to claim 1, wherein a quantity of the first images is more than three and a quantity of the second images is more than three.

7. The processing method for multiple depth maps according to claim 1, wherein a quantity of the first images is the same as that of the second images.

8. A processing system for multiple depth maps, comprising:

an image capturing module used to simultaneously obtain a plurality of first images and a plurality of second images;

a combination unit used to combine the first images and the second images, which are simultaneously obtained, to obtain a composite image;

only one depth generating unit used to receive the composite image and calculate the composite image to obtain a plurality of depth maps corresponding to the first images and the two images and corresponding to an identical time point;

wherein the combination unit arranges the first images in a vertical direction and arranges the second images in a vertical direction; or the combination unit arranges the first images in a horizontal direction and arranges the second images in a horizontal direction.

9. The processing system for multiple depth maps according to claim 8, wherein the image capturing module comprises:

a plurality of image capturing units used to simultaneously capture a plurality of original images; and a plurality of conversion units used to obtain the first images and the second images according to the original images.

10. The processing system for multiple depth maps according to claim 9, wherein a quantity of the first images is two, a quantity of the second images is two and a quantity of imaged captured by the image capturing units is two or three.

11. The processing system for multiple depth maps according to claim 8, wherein the depth generating unit calculates each of the first images and each of the second images to obtain each of the depth maps in a time-division multiplexing manner.

12. The processing system for multiple depth maps according to claim 8, wherein a quantity of the first images is more than three and a quantity of the second images is also more than three.

13. The processing system for multiple depth maps according to claim 8, wherein a quantity of the first images is the same as that of the second images.

14. A processing system for multiple depth maps, comprising:

an image capturing module used to simultaneously obtain a plurality of first images and a plurality of second images;

a combination unit used to combine the first images and the second images, which are simultaneously obtained, to obtain a composite image; and only one depth generating unit used to receive the composite image and calculate the composite image to obtain a plurality of depth maps corresponding to the first images and the two images and corresponding to an identical time point;

wherein the first images have different resolutions and the second images have different resolutions;

wherein the combination unit arranges the first images in a vertical direction and arranges the second images in a vertical direction; or the combination unit arranges the first images in a horizontal direction and arranges the second images in a horizontal direction.

* * * * *